US006871442B2

(12) United States Patent
Wyatt

(10) Patent No.: US 6,871,442 B2
(45) Date of Patent: Mar. 29, 2005

(54) EXPANDABLE BAIT SLEEVE AND METHOD THEREFOR

(76) Inventor: Daniel Wyatt, 6804 Accent Ct., Las Vegas, NV (US) 89108

( * ) Notice: Subject to any disclaimer, the term of this patent is extended or adjusted under 35 U.S.C. 154(b) by 0 days.

(21) Appl. No.: 09/934,127

(22) Filed: Aug. 22, 2001

(65) Prior Publication Data

US 2003/0037479 A1 Feb. 27, 2003

(51) Int. Cl.[7] .......................... A01K 97/04; A01K 83/06
(52) U.S. Cl. ............................................ 43/41; 43/44.4
(58) Field of Search ................ 43/44.4, 42.53, 43/41, 42.36, 42.06, 44.2, 44.8, 42.05

(56) References Cited

U.S. PATENT DOCUMENTS

| | | | | |
|---|---|---|---|---|
| 556,494 A | * | 3/1896 | Dales ............................ | 43/41 |
| 856,867 A | * | 6/1907 | Hayward ....................... | 43/41 |
| 862,150 A | * | 8/1907 | Fredricks ...................... | 43/41 |
| 889,804 A | * | 6/1908 | Pflueger ................... | 43/42.06 |
| 1,278,146 A | * | 9/1918 | Henthorn ...................... | 43/41 |
| 1,788,674 A | * | 1/1931 | Hughes ...................... | 43/57.1 |
| 1,816,725 A | * | 7/1931 | Freeman ........................ | 43/41 |
| 2,016,960 A | * | 10/1935 | Dillon ...................... | 43/42.36 |
| 2,102,739 A | * | 12/1937 | Peters ........................... | 43/41 |
| 2,183,816 A | * | 12/1939 | Lovelace ................... | 43/42.06 |
| 2,216,929 A | * | 10/1940 | Zander et al. ............. | 43/42.06 |
| 2,467,971 A | * | 4/1949 | Frair ............................. | 43/41 |
| 2,741,058 A | * | 4/1956 | Allman ..................... | 43/42.36 |
| 2,828,571 A | * | 4/1958 | Caplan .......................... | 43/41 |
| 2,839,866 A | * | 6/1958 | Jay ............................... | 43/41 |
| 2,870,563 A | * | 1/1959 | Rose ............................. | 43/41 |
| 2,937,466 A | * | 5/1960 | Mays ............................ | 43/41 |
| 2,972,831 A | * | 2/1961 | Anselmi ..................... | 43/44.4 |
| 3,273,277 A | * | 9/1966 | Valentine ...................... | 43/41 |
| 3,688,430 A | * | 9/1972 | Balch ........................ | 43/42.06 |
| 3,724,117 A | * | 4/1973 | Flanagan, Jr. ............... | 43/42.24 |
| 3,760,526 A | * | 9/1973 | Hicks .......................... | 43/44.4 |
| 3,760,529 A | * | 9/1973 | Hicks ............................ | 43/41 |
| 3,893,255 A | * | 7/1975 | Hicks ............................ | 43/41 |
| 3,991,504 A | * | 11/1976 | Pieper ...................... | 43/42.06 |
| 4,133,135 A | * | 1/1979 | Miles ....................... | 43/42.13 |
| 4,253,263 A | * | 3/1981 | Franklin et al. ........... | 43/42.36 |
| 4,777,757 A | * | 10/1988 | de Marees van Swinderen ............................................. | 43/41 |
| 4,788,788 A | | 12/1988 | Brockett | |
| 4,790,100 A | * | 12/1988 | Green, Sr. ................. | 43/42.26 |
| 4,839,982 A | * | 6/1989 | Wood ............................ | 43/41 |
| 4,961,280 A | * | 10/1990 | Hudson ......................... | 43/41 |
| 5,117,574 A | * | 6/1992 | Perry ........................ | 43/42.06 |
| 5,197,219 A | * | 3/1993 | Cook, Jr. et al. ............... | 43/42 |
| 5,299,378 A | * | 4/1994 | Ballard ..................... | 43/42.06 |
| 5,377,442 A | | 1/1995 | Gariglio | |
| 5,529,228 A | * | 6/1996 | Biagi ......................... | 383/117 |
| 5,533,296 A | * | 7/1996 | Jansen ....................... | 43/42.36 |
| 5,946,848 A | * | 9/1999 | Ysteboe et al. ............ | 43/42.53 |
| 6,006,468 A | * | 12/1999 | Hnizdor ..................... | 43/44.2 |
| 6,101,758 A | * | 8/2000 | Finley ....................... | 43/42.22 |
| 6,247,260 B1 | * | 6/2001 | Kandlbinder et al. .......... | 43/41 |
| 6,266,914 B1 | * | 7/2001 | Johnson et al. ............ | 43/42.13 |

FOREIGN PATENT DOCUMENTS

FR          1513030 B1 * 1/1968 ................ 43/44.2

* cited by examiner

*Primary Examiner*—Darren W. Ark
(74) *Attorney, Agent, or Firm*—Craig Weiss; Harry M. Weiss; Weiss, Moy & Harris, P.C.

(57) ABSTRACT

An expandable bait sleeve and method therefore capable of expanding in order to securely retain baits of various sizes and dimensioned to be coupled to various types of fishing lures and fishing hooks in order to improve a fisherman's chances of catching a fish by minimizing the chance that a fish will be able to "steal" the bait without being caught on the hook.

4 Claims, 4 Drawing Sheets

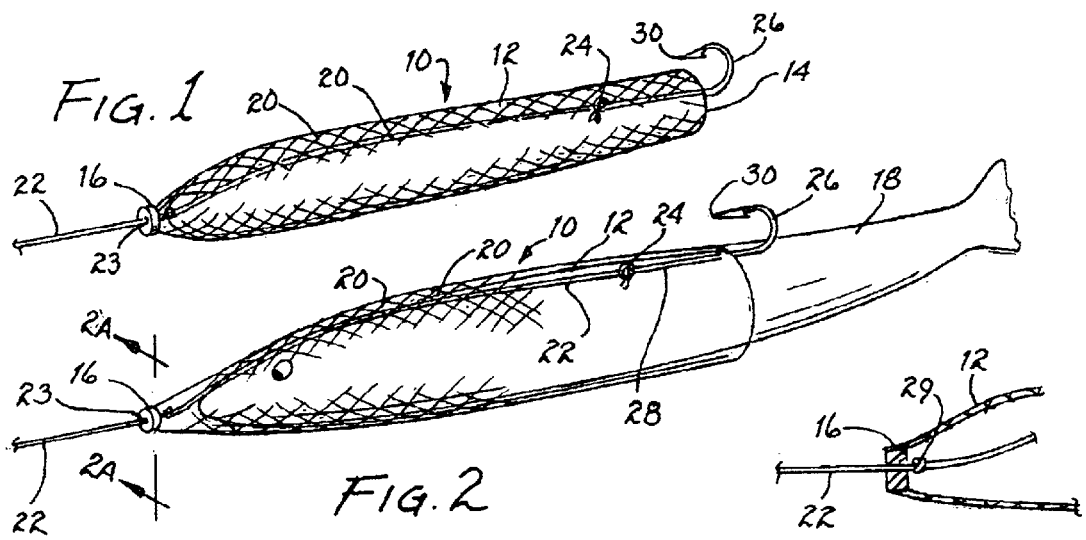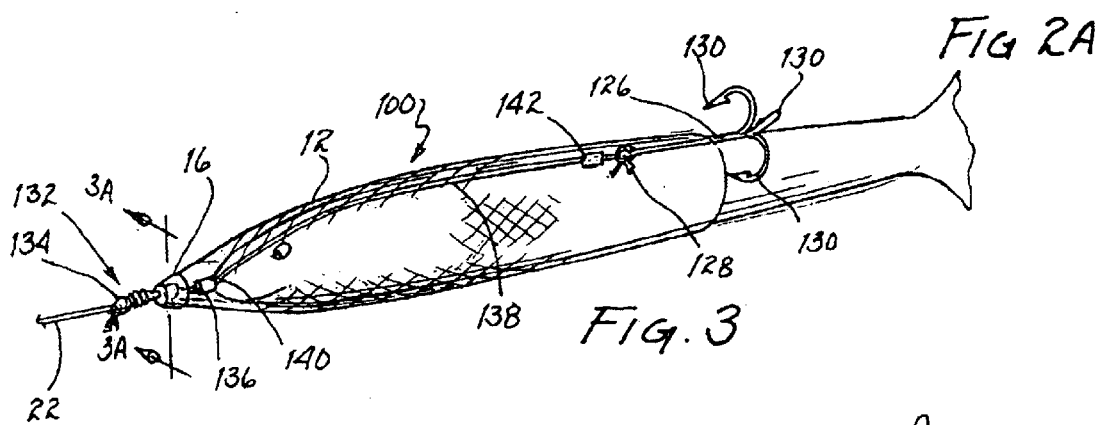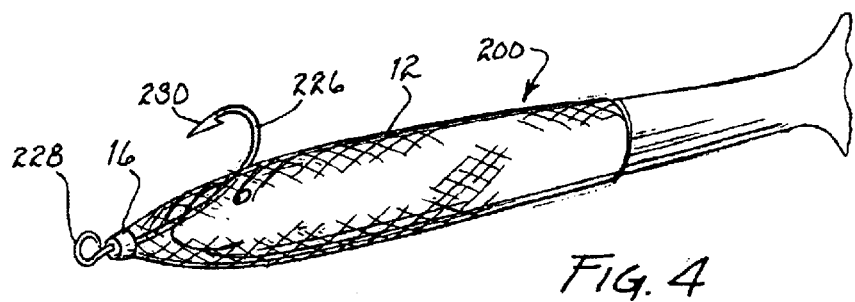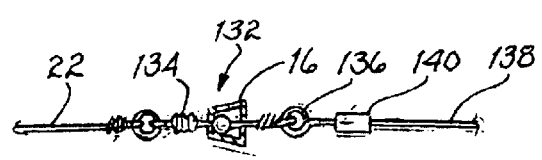

EXPANDABLE BAIT SLEEVE AND METHOD THEREFOR

FIELD OF THE INVENTION

This invention relates generally to fishing aids and, more specifically, to an expandable bait sleeve and method therefor capable of expanding in order to securely retain baits of various sizes and dimensioned to be coupled to a fishing line and a fishing hook in order to improve a fisherman's chances of catching a fish by minimizing the chance that a fish will be able to "steal" the bait without being caught on the hook

BACKGROUND OF THE INVENTION

Fishing is not only a popular pastime but also a commercial industry, as well as a sport. All those that fish generally use a form of bait to lure a fish to some sort of hook. Many fishermen, especially those who do so recreationally, attach various kinds of baits to hooks which are in turn attached to a fishing line that is coupled to a fishing rod. Catching a fish with a fishing lure is essentially a two-step process: first one must attract the fish with a lure by using a good bait, and then one must actually snare the fish on a hook while the fish is trying to eat the bait. There are many companies who market different fishing lures to attract fish, leaving fishermen with the dilemma of how to attach a bait to a hook in such a way that the bait will stay on the hook during casting, while in the water, and while a fish is eating it. Some baits, both live and artificial, are fragile, thus contributing to the difficulty of securely attaching the bait to a hook.

There have been various attempts to use holders of some kind to secure bait to a hook. For example, U.S. Pat. No. 4,961,280 issued to Hudson discloses a transparent member for encasing the hook and the bait and a sealing means for sealing the bait and hook in the transparent member. The Hudson patent presents several problems, however. First, the sealing member prevents fish from being able to nibble on any portion of the bait, since it is entirely encased in the transparent member. Additionally, the transparent member is fixed in size and therefore unable to retain bait by means of frictional engagement. U.S. Pat. No. 4,788,788 issued to Brockett discloses a catfish bait holder that utilizes a hollow cylinder and a cylindrical sponge to keep bait inside. The Brockett cylinder is designed for use with a viscous bait, not live or standard artificial baits. Like the Hudson patent, the Brockett cylinder is fixed in size and is therefore unable to expand to hold both larger baits as well as smaller baits.

A need therefore existed for an expandable bait sleeve capable of expanding while at the same time securely retaining baits of various sizes so that the expandable bait sleeve can be coupled to a hook in order to improve a fisherman's chances of catching a fish by minimizing the chance that a fish will be able to separate the bait from the hook without being caught on the hook.

SUMMARY OF THE INVENTION

An object of the present invention is to provide an expandable bait sleeve capable of expanding in order to securely retain baits of various sizes so that the expandable bait sleeve can be coupled to a hook in order to increase the chances that a fish will be caught while trying to nibble on the bait secured in the bait sleeve.

BRIEF DESCRIPTION OF THE PREFERRED EMBODIMENTS

In accordance with one embodiment of the present invention, an expandable bait sleeve is disclosed, comprising a sleeve having an interior surface and an exterior surface and a first end and a second end, the first end is open and dimensioned to receive a portion of a bait, wherein the sleeve is sufficiently expandable so as to enlarge to a larger diameter when a bait is inserted into the open first end of the sleeve while at the same time the sleeve is sufficiently rigid so that the bait is retained in the sleeve by frictional engagement with the interior surface of the sleeve.

In accordance with another embodiment of the present invention, a method for catching fish is disclosed, comprising, in combination, the steps of providing a sleeve having an interior surface and an exterior surface and a first end and a second end, the first end is open and dimensioned to receive a portion of a bait, wherein the sleeve is sufficiently expandable so as to enlarge to a larger diameter when a bait is inserted into the open first end of the sleeve while at the same time the sleeve is sufficiently rigid so that the bait is retained in the sleeve by frictional engagement with the interior surface of the sleeve, inserting a portion of bait into the open first end of the sleeve, providing a fishing line having a first end and a second end, the second end is dimensioned to pass through an aperture defined by the second end of the sleeve, coupling the first end of the fishing line to a fishing rod, providing a fishing hook having a line coupling end and a hook end, the hook end is dimensioned to protrude outside of the open first end of the sleeve, coupling the line coupling end of the fishing hook to the second end of the fishing line; and casting the sleeve.

In accordance with still another embodiment of the present invention a method for creating an improved soft artificial bait is disclosed comprising, in combination, the steps of providing a sleeve having an interior surface and an exterior surface and a first end and a second end, the sleeve comprises a mesh-like configuration defining a plurality of apertures, placing the sleeve in a mold for a soft artificial bait, and injecting plastisol into the mold to create a soft artificial bait with said sleeve as a skeleton.

The foregoing and other objects, features, and advantages of the invention will be apparent from the following, more particular description of the preferred embodiments of the invention, as illustrated in the accompanying drawings.

BRIEF DESCRIPTION OF THE DRAWINGS

FIG. 1 is a perspective view of the expandable bait sleeve of the present invention.

FIG. 2 is a perspective view of the expandable bait sleeve of FIG. 1, showing a bait inserted into the expandable bait sleeve.

FIG. 2A is a side, cross-sectional view of a portion of the expandable bait sleeve of FIG. 2, taken along line 2a—2a and showing a knot in the fishing line which prevents the hook end of the fishing line from being drawn back through the second end of the expandable bait sleeve.

FIG. 3 is a perspective view of an alternative embodiment of the expandable bait sleeve of the present invention, showing a swivel harness, a leader and a treble hook.

FIG. 3A is a side, cross-sectional view of the swivel harness of FIG. 3, taken along line 3A—3A.

FIG. 4 is a perspective view of an alternative embodiment of the expandable bait sleeve of the present invention, showing a fishing hook molded to the second end of the expandable bait sleeve.

DETAILED DESCRIPTION OF THE PREFERRED EMBODIMENTS

Figure 5:
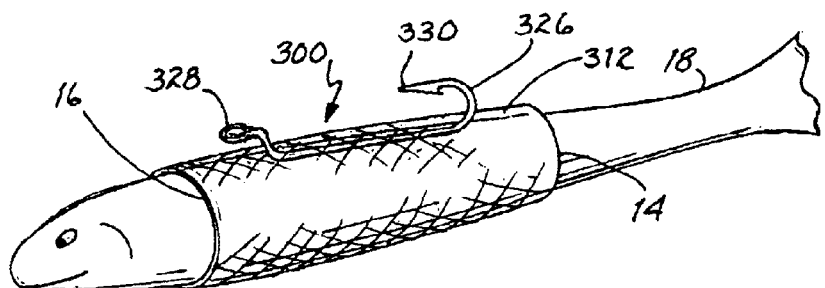
FIG. 5 is a perspective view of an alternative embodiment of the expandable bait sleeve of the present invention, showing an expandable bait sleeve with an open first end and an open second end and a fishing hook mounted in a center portion of the sleeve.

Referring to FIGS. 1 and 2, the preferred embodiment of the expandable bait sleeve, hereinafter expandable bait sleeve 10, is shown. The expandable bait sleeve 10 comprises a sleeve 12 having an interior surface and an exterior surface and a first end 14 and a second end 16. The first end 14 is open and dimensioned to receive a portion of a bait 18 (shown in FIG. 2). The sleeve 12 is sufficiently expandable so as to enlarge to a larger diameter when a bait 18 is inserted into the open first end 14 of the sleeve 12 while at the same time the sleeve 12 is sufficiently rigid so that the bait 18 is retained in the sleeve 12 by frictional engagement with the interior surface of the sleeve 12.

In the preferred embodiment, the sleeve 12 is comprised of polyethylene terephthalate, although it should be clearly understood that substantial benefit could be derived from an alternative configuration of the expandable bait sleeve 10 in which the sleeve 12 is comprised of another material so long as that material imparts to the sleeve 12 flexibility and stretchability sufficient so that the sleeve 12 can expand when a bait 18 is inserted and still retain the bait 18 by means of frictional engagement.

In the preferred embodiment, the sleeve 12 comprises a plurality of strands forming a mesh-like configuration defining a plurality of apertures 20 so that the bait 18 can be seen and smelled by a fish (not shown) while the bait 18 is retained in the sleeve 12, although it should be clearly understood that substantial benefit could be derived from an alternative configuration of the expandable bait sleeve 10 in which the sleeve 12 is solid without apertures 20.

In the preferred embodiment, the expandable bait sleeve 10 further comprises a fishing line 22 having a first end coupled to a fishing rod (not shown) and a second end 24 dimensioned to pass through an aperture 23 defined by the second end 16 of the sleeve 12. Preferably, the second end 24 of the fishing line 22 passes through the aperture 23 in the second end 16 of the sleeve 12 and is subsequently coupled to a fishing hook 26. The fishing hook 26 has a line coupling end 28 and a hook end 30. The second end 24 of the fishing line 22 is preferably coupled to the line coupling end 28 of the fishing hook 26. In the preferred embodiment, a knot 29 (shown in FIG. 2A) is tied in the fishing line 22 to prevent the portion of the fishing line 22 which is coupled to the fishing hook 26 from being pulled back through the second end 16 of the sleeve 12, although it should be clearly understood that substantial benefit could be derived from an alternative configuration of the expandable bait sleeve 10 in which an alternative means for preventing the fishing hook 26 from being pulled through the second end 16 of the sleeve 12 is utilized. In the preferred embodiment, the hook end 30 of the fishing hook 26 protrudes outside of the first end 14 of the sleeve 12, although it should be clearly understood that substantial benefit could be derived from an alternative configuration of the expandable bait sleeve 10 in which the hook end 30 of the fishing hook 26 protrudes out of a portion of the sleeve 12 between the first end 14 and the second end 16.

Referring now to FIGS. 3 and 3A, an alternative embodiment of the expandable bait sleeve 10, hereinafter 100, is shown. The expandable bait sleeve 100 (shown in FIG. 3) is essentially the same as the expandable bait sleeve 10, although the expandable bait sleeve 100 comprises a swivel harness 132. For this reason, the same reference numbers used in describing the features of the expandable bait sleeve 10 of the preferred embodiment will be used when describing the identical features of the expandable bait sleeve 100. The swivel harness 132 has a first end 134 and a second end 136. The first end 134 of the swivel harness 132 is dimensioned to swivel and is coupled to an outer surface of the second end 16 of the sleeve 12 (shown in FIG. 3) and is dimensioned to be coupled to a fishing line 22. The second end 136 of the swivel harness 132 is coupled to an outer surface (inner surface) of the second end 16 of the sleeve 12 and is dimensioned to be coupled to a leader 138. The expandable bait sleeve 100 further comprises a leader 138 having a first end 140 and a second end 142 (shown in FIG. 3). The first end 140 is coupled to the second end 136 of the swivel harness 132.

Referring now to FIG. 3, the expandable bait sleeve 100 further comprises a fishing hook 126 having a leader coupling end 128 and at least one hook end 130. The leader coupling end 128 is coupled to the second end 142 of the leader 138 and the at least one hook end 130 is dimensioned to protrude outside of the sleeve 12. In the preferred embodiment of the expandable bait sleeve 100, the fishing hook 126 is a treble hook, although it should be clearly understood that substantial benefit could be derived from an alternative configuration of the expandable bait sleeve 100 in which a fishing hook other than a treble hook is used. In the preferred embodiment of the expandable bait sleeve 100, the leader 138 is made of wire, although it should be clearly understood that substantial benefit could be derived from an alternative configuration of the expandable bait sleeve 100 in which the leader 138 is made of another material.

Referring now to FIG. 4, an alternative embodiment of the expandable bait sleeve 10, hereinafter 200, is shown. The expandable bait sleeve 200 is essentially the same as the expandable bait sleeve 10, although the expandable bait sleeve 200 comprises a fishing hook 226 molded to the second end 16 of the sleeve 12. For this reason, the same reference numbers used in describing the features of the expandable bait sleeve 10 of the preferred embodiment will be used when describing the identical features of the expandable bait sleeve 200. The expandable bait sleeve 200 comprises a fishing hook 226 molded into the second end 16 of the sleeve 12 so that a line coupling end 228 of the fishing hook 226 is coupled to an outer surface of the second end 16 of the sleeve 12 and a hook end 230 of the fishing hook 226 is dimensioned to protrude outside of an upper portion of the sleeve 12 proximate the second end 16 of the sleeve 12.

Figure 6:
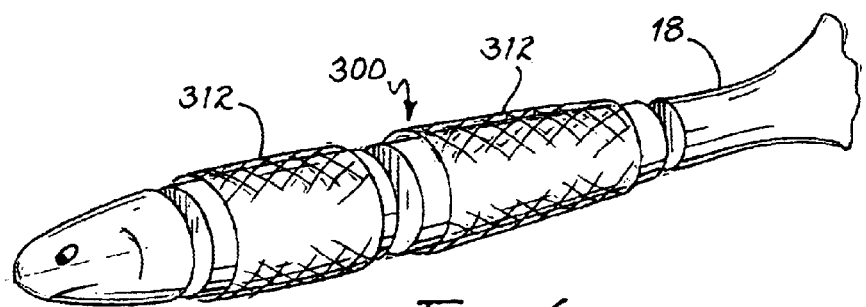
FIG. 6 is a perspective view of an alternative embodiment of the expandable bait sleeve of the present invention, showing a bait inserted into two expandable bait sleeves, each with an open first end and an open second end, so that the bait can be cut into at least two smaller segments.

Referring now to FIGS. 5 and 6, an alternative embodiment of the expandable bait sleeve 10, hereinafter 300, is shown. The expandable bait sleeve 300 is essentially the same as the expandable bait sleeve 10, although the second end 16 of the expandable bait sleeve 300 is open. For this reason, the same reference numbers used in describing the features of the expandable bait sleeve 10 of the preferred embodiment will be used when describing the identical features of the expandable bait sleeve 300. In the expandable bait sleeve 300, the second end 16 of the sleeve 312 is open so that a bait 18 can be inserted through the open first end 14 of the sleeve 312 and pass through the sleeve 312 so that a portion of the bait 18 protrudes out of the open second end 16 of the sleeve 312.

Referring now to FIG. 5, the sleeve 312 of the expandable bait sleeve 300 is preferably coupled to a fishing hook 326. The fishing hook 326 is preferably coupled to a center portion of the sleeve 312 so that a hook end 330 protrudes out of the center portion of the sleeve 312 and a line coupling end 328 dimensioned to be coupled to a fishing line (not shown) protrudes out of the center portion of the sleeve 312.

Referring now to FIG. 6, one use for the expandable bait sleeve 300 is to create smaller pieces of bait 18 from a single larger piece of bait 18. A bait 18 can be inserted through two sleeves 312, and then the bait 18 can be cut into at least two pieces so that each piece is surrounded by a sleeve 312. These smaller pieces of bait 18 can then be attached to fishing hooks 326.

Figure 7:
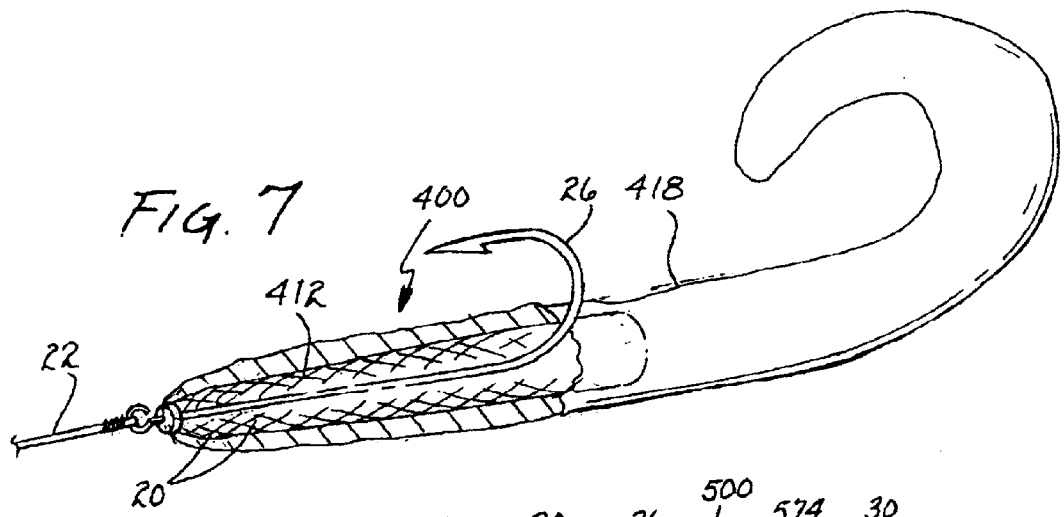
FIG. 7 is a perspective view of an alternative embodiment of the expandable bait sleeve of the present invention, showing the bait sleeve molded into soft artificial bait.

Referring now to FIG. 7, an alternative embodiment of the expandable bait sleeve 10, hereinafter 400, is shown. The expandable bait sleeve 400 is essentially the same as the expandable bait sleeve 10, although the sleeve 412 is molded into a soft bait 418. For this reason, the same reference numbers used in describing the features of the expandable bait sleeve 10 of the preferred embodiment will be used when describing the identical features of the expandable bait sleeve 400. The sleeve 412 of the expandable bait sleeve 400 is comprised of a mesh-like configuration defining a plurality of apertures 20. The sleeve 412 is placed in a mold used for creating soft artificial bait 418. Then plastisol is injected into the mold so as to create a soft artificial bait with a sleeve as a skeleton. The sleeve 412 portion of the new combined sleeve 412/soft artificial bait 418 can then be coupled to a fishing hook 26. The fishing hook 26 can then be coupled to a fishing line 22 proximate a second end 16 of the sleeve 412. Although, in the preferred embodiment of the expandable bait sleeve 400, plastisol is injected into the mold for soft artificial bait 418, it should be clearly understood that substantial benefit could be derived from an alternative configuration of the expandable bait sleeve 400 in which a material other than plastisol is used so long as it imparts to the bait 418 the same qualities of flexibility and stretchability.

Figure 8:
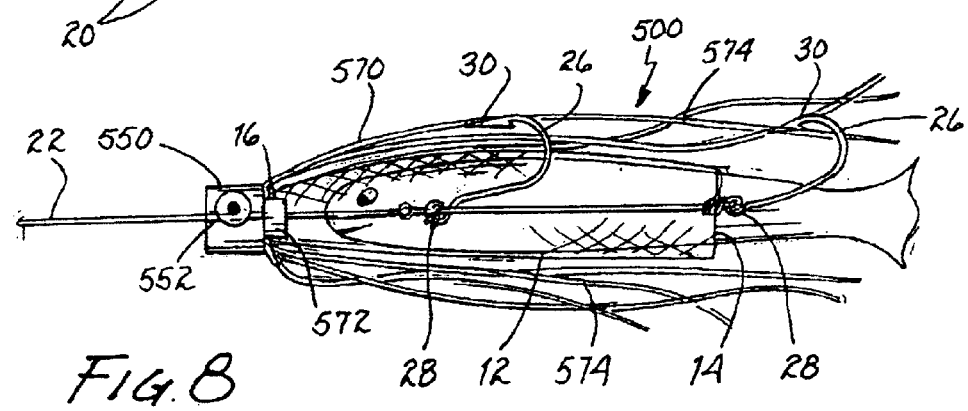
FIG. 8 is a side view of an alternative embodiment of the expandable bait sleeve of the present invention, showing the sleeve incorporated into a teaser bait.

Referring now to FIG. 8, an alternative embodiment of the expandable bait sleeve 10, hereinafter 500, is shown. The expandable bait sleeve 500 is essentially the same as the expandable bait sleeve 10, although the second end 16 of the sleeve 12 is coupled to a head 550 having a skirt 570. For this reason, the same reference numbers used in describing the features of the expandable bait sleeve 10 of the preferred embodiment will be used when describing the identical features of the expandable bait sleeve 500. The expandable bait sleeve 500 comprises a head 550 coupled to the second end 16 of the sleeve 12. The head 550 defines an aperture 552 in a center portion thereof dimensioned to allow a fishing line 22 to pass therethrough. The expandable bait sleeve 500 further comprises at least one, and preferably two, fishing hooks 26, each having a line coupling end 28 dimensioned to be coupled to a fishing line 22 and a hook end 30 dimensioned to protrude outside of the sleeve 12. The expandable bait sleeve 500 further comprises a skirt 570 having a narrow portion 572 and a wide portion 574. The narrow portion 572 is coupled to the head 550 and the wide portion 574 is dimensioned to cover at least a portion of the sleeve 12. The expandable bait sleeve 500 incorporates the sleeve 12 into what is known in the art as a teaser or a tuna teaser.

Figure 9:
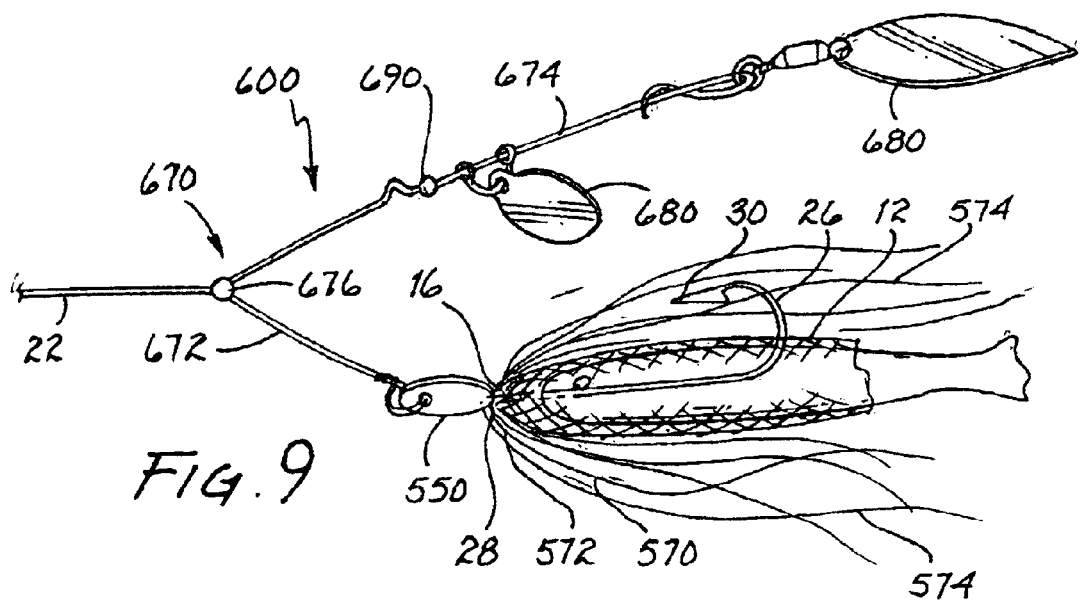
FIG. 9 is a side view of an alternative embodiment of the expandable bait sleeve of the present invention, showing the sleeve incorporated into a tandem spinner bait.

Referring now to FIG. 9, an alternative embodiment of the expandable bait sleeve 500, hereinafter 600, is shown. The expandable bait sleeve 600 is essentially the same as the expandable bait sleeve 500, although the expandable bait sleeve 600 is coupled to a tandem spinner bait. For this reason, the same reference numbers used in describing the features of the expandable bait sleeve 500 of the preferred embodiment will be used when describing the identical features of the expandable bait sleeve 600. The expandable bait sleeve 600 comprises a head 550 coupled to the second end 16 of the sleeve 12. The expandable bait sleeve 600 comprises a fishing hook 26 having a coupling end 28 dimensioned to be coupled to the head 550 and a hook end 30 dimensioned to protrude outside of the sleeve 12. The expandable bait sleeve 600 further comprises a skirt 570 having a narrow portion 572 and a wide portion 574. The narrow portion 572 is coupled to the head 550 and the wide portion 574 is dimensioned to cover at least a portion of the sleeve 12. The expandable bait sleeve 600 further comprises a substantially L-shaped shaft 670 having a first arm 672 and a second arm 674. The first arm 672 is coupled to the head 550. A center portion 676 of the substantially L-shaped shaft 670 is dimensioned to be coupled to a fishing line 22. The expandable bait sleeve 600 further comprises at least one, and preferably two spinner blades 680 coupled to the second arm 674 of the substantially L-shaped shaft 670. The expandable bait sleeve 600 further comprises at least one, and preferably two or more beads 690 coupled to the second arm 674 of the substantially L-shaped shaft 670. The expandable bait sleeve 600 incorporates the sleeve 12 into what is known in the art as a tandem spinner bait or spinner bait.

Figure 10:
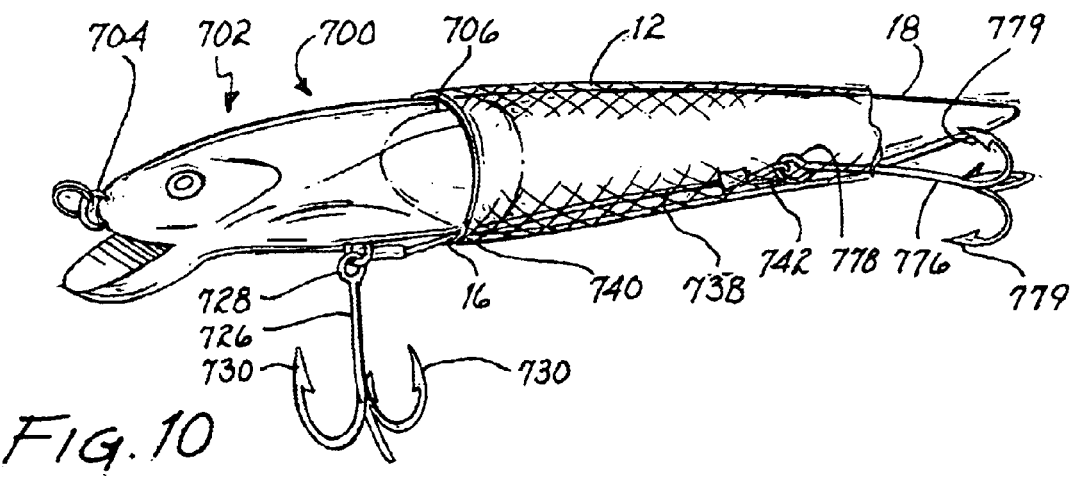
FIG. 10 is a perspective view of an alternative embodiment of the expandable bait sleeve of the present invention, showing the sleeve incorporated into a crank bait.
Figure 10A:
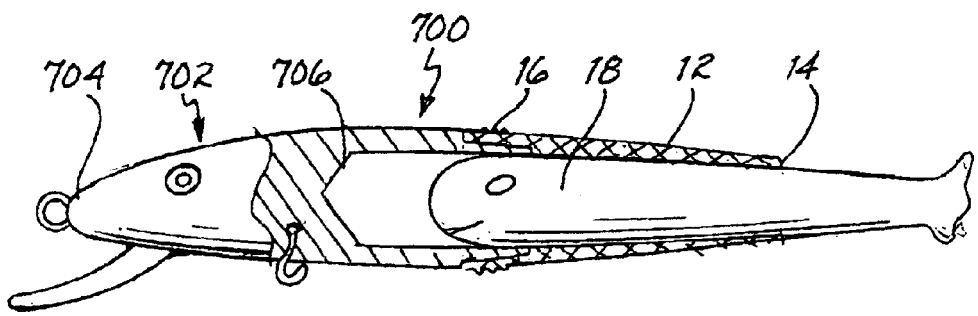
FIG. 10A is a side, cross-sectional view of the expandable bait sleeve of FIG. 10.

Referring now to FIGS. 10 and 10A, an alternative embodiment of the expandable bait sleeve 10, hereinafter 700, is shown. The expandable bait sleeve 700 is essentially the same as the expandable bait sleeve 10, although the sleeve 12 is coupled to a crank bait. For this reason, the same reference numbers used in describing the features of the expandable bait sleeve 10 of the preferred embodiment will be used when describing the identical features of the expandable bait sleeve 700. The expandable bait sleeve 700 comprises a crank bait head 702 having a front portion and 704 and a rear portion 706. The front portion 704 is dimensioned to be coupled to a fishing line (not shown) and the rear portion 706 is coupled to the second end 16 of the sleeve 12. The expandable bait sleeve 700 further comprises a first fishing hook 726 (shown in FIG. 10) having a first end 728 (shown in FIG. 10) coupled to the crank bait head 702 and a second end 730 (shown in FIG. 10) comprising at least one hook. The expandable bait sleeve 700 further comprises a wire 738 (shown in FIG. 10) having a first end 740 (shown in FIG. 10) coupled to the crank bait head and a second end 742 (shown in FIG. 10) The expandable bait sleeve 700 further comprises a second fishing hook 776 (shown in FIG. 10) having a wire coupling end 778 (shown in FIG. 10) dimensioned to be coupled to the second end 742 of the wire 738 and a hook end 779 (shown in FIG. 10) dimensioned to protrude outside of the first end 14 of the sleeve 12. The expandable bait sleeve 700 incorporates the sleeve 12 into what is known in the art as a crank bait.

Figure 11:
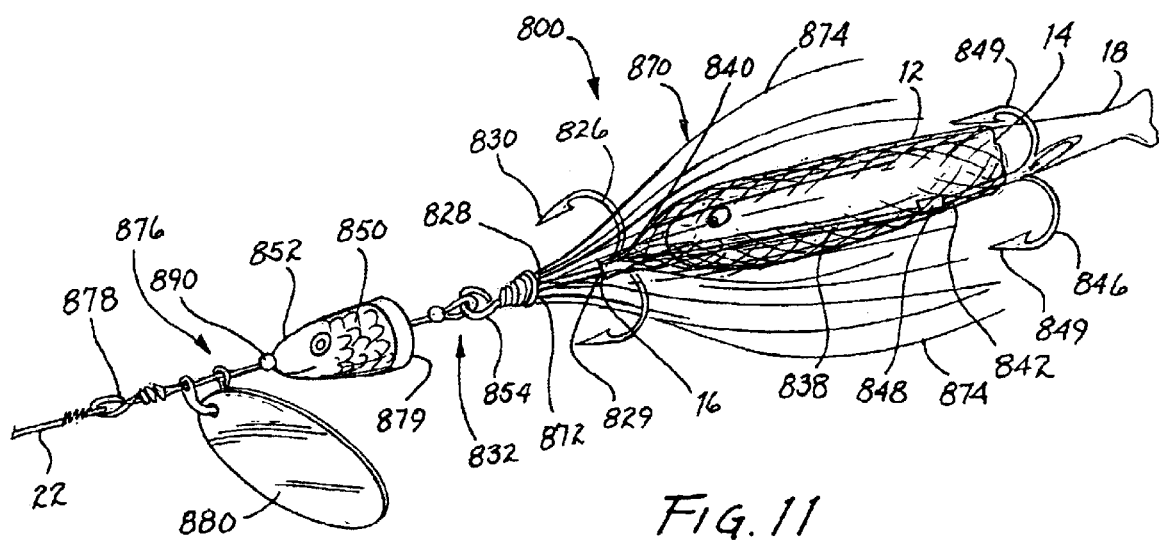
FIG. 11 is a perspective view of an alternative embodiment of the expandable bait sleeve of the present invention, showing the sleeve incorporated into a bucktail spinner.

Referring now to FIG. 11, an alternative embodiment of the expandable sleeve 10, hereinafter 800, is shown. The expandable bait sleeve 800 is essentially the same the expandable bait sleeve 600, although the sleeve 12 is coupled to a bucktail spinner. The expandable bait sleeve 800 comprises a harness 832. The expandable bait sleeve further comprises a first fishing hook 826 having a first end 828, a second end 830 and a center portion 829 therebetween. The first end 828 of the first fishing hook 826 is molded to the harness 832 and the center portion 829 of the first fishing hook 826 is coupled to the second end 16 of the sleeve 12. The second end 830 of the first fishing hook 826 comprises at least one hook. The expandable bait sleeve 800 further comprises a skirt 870 having a narrow portion 872 and a wide portion 874. Preferably, the skirt 870 is comprised of the hair of a deer, although it should be clearly understood that substantial benefit could be derived from an alternative configuration of the expandable bait sleeve 800 in which a material other than deer hair is used for the skirt 870. The narrow portion 872 of the skirt 870 is coupled to the harness 832 and the wide portion 874 is dimensioned to cover at least a portion of the sleeve 12 and the first fishing hook 826. The expandable bait sleeve 800 further comprise a wire 838 having a first end 840 and a second end 842. The first end of the wire 838 is coupled to the second end 16 of the sleeve 12. The expandable bait sleeve 800 further comprises a second fishing hook 846 having a wire coupling end 848 and a hook end 849. The wire coupling end 848 is dimensioned to be coupled to the second end 842 of the wire 838 and the hook end 849 protrudes outside of the first end 14 of the sleeve 12. The expandable bait sleeve 800 further comprises a head 850 having a front portion 852 and a rear portion 854. The rear portion 854 is coupled to the harness 832. The expandable bait sleeve 800 further comprises a shaft 876 having a first end 878 and a second end 876. The second end 879 of the shaft 875 is coupled to the front portion 852 of the head 850 and the first end 878 of the shaft 876 is dimensioned to be coupled to a fishing line 22. The expandable bait sleeve 800 further comprises at least one spinner blade 880 coupled to the shaft 876. The expandable bait sleeve 800 further comprises at least one bead 890 coupled to the shaft 876. The expandable bait sleeve 800 incorporates the sleeve 12 into what is known in the art as a buck tail spinner.

Figure 12:
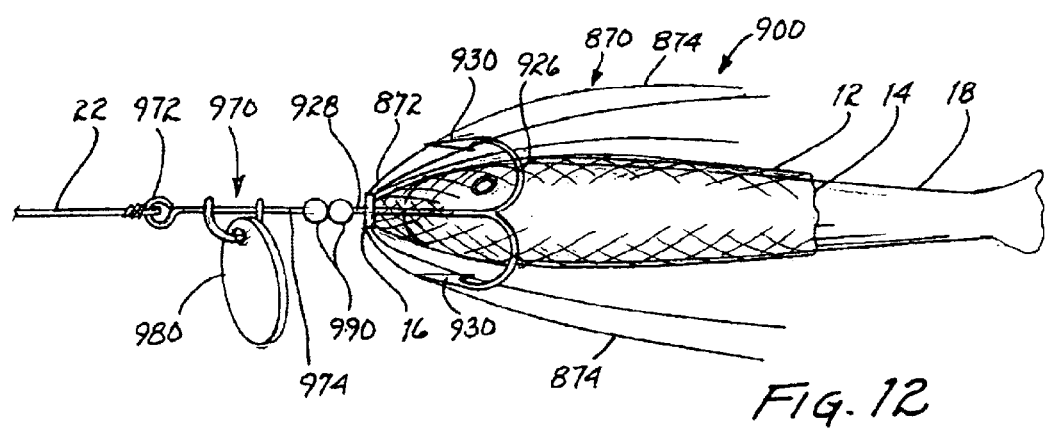
FIG. 12 is a side view of an alternative embodiment of the expandable bait sleeve of the present invention, showing the sleeve incorporated into a spinner.

Referring now to FIG. 12, an alternative embodiment of the expandable bait sleeve 10, hereinafter 900, is shown. The expandable bait sleeve 900 is essentially the same as the expandable bait sleeve 800, although the sleeve 12 is coupled to a spinner. For this reason, the same reference numbers used in describing the features of the expandable bait sleeve 800 of the preferred embodiment will be used when describing the identical features of the expandable bait sleeve 900. The expandable bait sleeve 900 comprises a skirt 870 having a narrow portion 872 coupled to the second end 16 of the sleeve and a wide portion 874 dimensioned to cover at least a portion of the sleeve 12. The expandable bait sleeve 900 further comprises a fishing hook 926 having a coupling end 928 and a hook end 930. The coupling end 928 of the fishing hook 926 is coupled to the second end 16 of the sleeve 12 and the hook end 930 is dimensioned to protrude outside of an upper portion of the sleeve 12 proximate the second end 16 of the sleeve 12. The expandable bait sleeve 900 further comprises a shaft 970 having a first end 972 and a second end 974. The second end 974 is coupled to the second end 16 of the sleeve 12 and the first end 972 is dimensioned to be coupled to a fishing line 22. The expandable bait sleeve 900 further comprises at least one spinner blade 980 coupled to the shaft 970. The expandable bait sleeve 900 further comprises at least one bead 990 coupled to the shaft 970. The expandable bait sleeve 900 incorporates the sleeve 12 into what is known in the art as a spinner.

While the invention has been particularly shown and described with reference to preferred embodiments thereof, it will be understood by those skilled in the art that the foregoing and other changes in form and details may be made therein without departing from the spirit and scope of the invention.

I claim:

1. An expandable bait sleeve assembly comprising:
    a fishing line;
    a bait;
    a fishing hook coupled to said fishing line; and
    a sleeve comprising a plurality of strands of a plastic material and forming a mesh-like configuration defining a plurality of apertures between said strands, said sleeve having an interior surface and an exterior surface and a first end and a second end, said second end of said sleeve being substantially closed and defining an aperture through which said fishing line passes, said first end of said sleeve being open and dimensioned to expand to receive at least a portion of said bait, said first end being free of means to one of constrict and close said first end, said interior surface of said sleeve retaining at least a portion of said bait and at least a portion of said fishing line and at least a portion of said fishing hook;
    wherein said sleeve being sufficiently expandable so as to expand circumferentially as a bait having a circumference larger than a circumference of said sleeve is inserted into said open first end of said sleeve without applying any force to any other portion of said sleeve to expand said sleeve while at the same time said sleeve is sufficiently rigid in order to compress and at least a portion of said bait and at least a portion of said fishing line and at least a portion of said fishing hook inside said interior surface of said sleeve.

2. The expandable bait sleeve assembly of claim 1 wherein said plastic strands are comprised of polyethylene terephthalate.

3. The expandable bait sleeve assembly of claim 1 further comprising:
    said fishing line further comprising:
        a swivel harness having a first end and a second end, said first end of said swivel harness being dimensioned to swivel and being coupled to an outer surface of said second end of said sleeve and being dimensioned to be coupled to a fishing line, said second end of said swivel harness being passed through an inner surface of said second end of said sleeve and being dimensioned to be coupled to a leader; and a leader having a first end and a second end, said first end being coupled to said second end of said swivel harness; and said fishing hook having a leader coupling end and at least one hook end, said leader coupling end being coupled to said second end of said leader and said at least one hook end being dimensioned to protrude outside of said sleeve.

4. A method for catching fish consisting of, in combination, the steps of:

providing a fishing line;

providing a bait;

providing a fishing hook coupled to said fishing line;

providing a sleeve comprising a plurality of strands of a plastic material and forming a mesh-like configuration defining a plurality of apertures between said strands, said sleeve having an interior surface and an exterior surface and a first end and a second end, said first end of said sleeve being open and dimensioned to expand to receive a portion of said bait, said first end being free of means to one of constrict and close said first end, said second end being substantially closed and defining an aperture therein;

inserting an end of said fishing line through said aperture defined by said closed end such that said end of said fishing line is within said interior surface of said sleeve;

coupling said fishing hook to said end of said fishing line; and inserting at least a portion of said bait into said open first end of said sleeve;

wherein said sleeve sufficiently expandable so as to enlarge to a larger diameter when a bait is inserted into said open first end of said sleeve while at the same time said sleeve is sufficiently rigid in order to compress and retain at least a portion of said bait and at least a portion of said fishing line and at least a portion of said fishing hook inside said interior surface of said sleeve.

* * * * *